Feb. 14, 1928.
J. MACHTOLF
VALVE
Filed Feb. 18, 1927
1,658,810
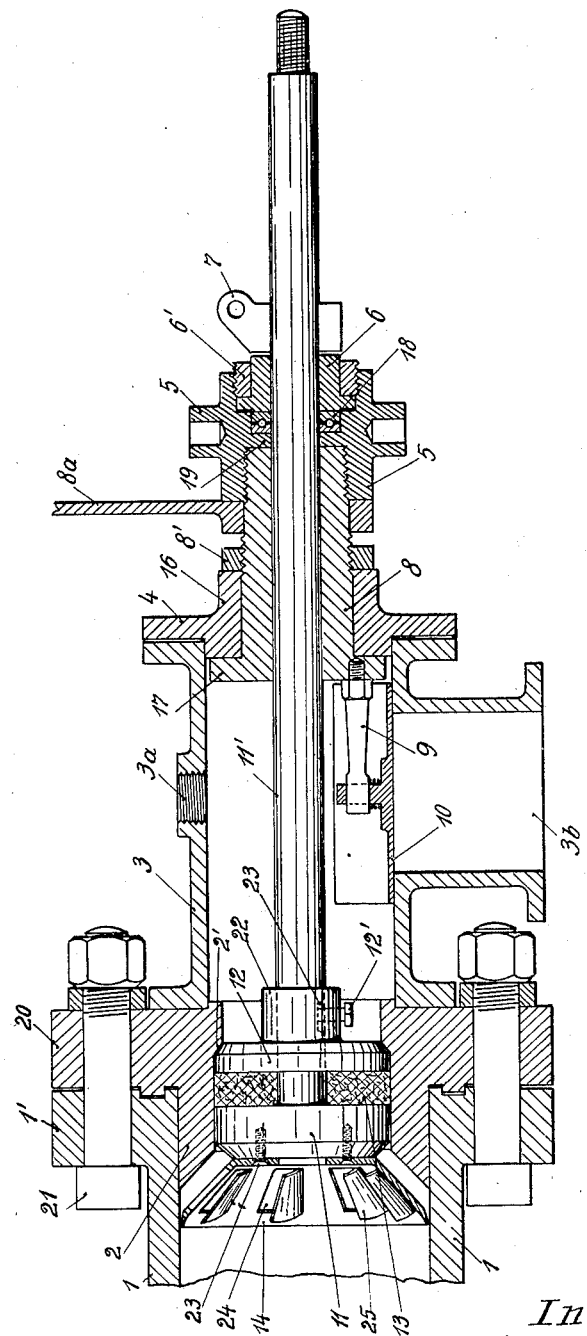
Inventor:
JOSEPH MACHTOLF
BY
ATTORNEY Patented Feb. 14, 1928.

1,658,810

UNITED STATES PATENT OFFICE.

JOSEF MACHTOLF, OF CELLE, GERMANY, ASSIGNOR TO THE FIRM CHR. HOSTMANN-STEINBERG'SCHE FARBENFABRIKEN G. M. B. H., OF CELLE, GERMANY.

VALVE.

Application filed February 18, 1927, Serial No. 169,396, and in Germany March 4, 1926.

My invention relates to improvements in valves, and more particularly in valves to be used in connection with receptacles in which suddenly exceedingly high pressure and high temperature are produced. Valves of this class are used for example in connection with tubular receptacles in which acetylene gas ignited for being split into its components, hydrogen and carbon, the latter being in the form of soot. When igniting a charge of acetylene gas the pressure produced within the receptacle will be more than 100 atmospheres, while the temperature rises for a few seconds as high as 3000° C. Therefore, if the valves are not absolutely tight, the gas is liable to escape through the minute passages formed between the valve body and its seat, and gradually to enlarge the said passages. Therefore, it is necessary to provide a valve which is absolutely tight, and with this object in view my improved valve body is made in two sections disposed coaxially one behind the other on the valve stem and enclosing an elastic packing medium between the same, the said elastic packing medium being pressed against the wall of a cylindrical chamber enclosing the valve sections.

For the purpose of explaining the invention an example embodying the same has been illustrated in the accompanying drawing, in which a longitudinal sectional elevation of the valve has been shown.

In describing the invention reference will be made to a valve which is used in connection with a receptacle in which acetylene gas is ignited for being split into its components. A valve of this class is provided at both ends of a tubular receptacle for passing hydrogen into the same for flushing out the soot, and for connecting the receptacle with a blower or fan for removing the soot therefrom.

My improved valve is mounted at both ends of a tubular receptacle 1 adapted to have the acetylene gas split therein, the figure of the drawing showing only one of the valves mounted at one end of the receptacle. As shown, a sleeve 2 formed with a flange 20 is fitted in the tubular receptacle 1, and it is fixed in position by screw-bolts 21. The axial bore of the said sleeve constitutes a cylindrical chamber having a conical shoulder 2' providing a valve seat. To the sleeve 2 a tubular member or casing 3 is secured in a suitable way, for example by means of screws (not shown), which member is provided with a tubular branch $3^b$ and an inlet opening $3^a$. To the outer end of the member 3 a sleeve 16 having a flange 4 is secured, and in the said sleeve a bushing 8 formed at its inner end with a flange or collar 17 is rotatable, the said bushing being fixed in position by means of a nut 8' screwing thereon and engaging the outer face of the sleeve 16. The bushing 17 provides a guide for a valve stem 11', and it has an arm 9 secured thereto which is connected with a slide valve 10 adapted to close either the branch $3^b$ or the inlet opening $3^a$. To the bushing 8 an arm $8^a$ is fixed by means of which the arm 9 and slide valve 10 may be turned into position for closing the branch $3^b$ or the inlet $3^a$. At the outer side of the said arm $8^a$ a cup 5 is screwed to the bushing 8, and within the said cup there is a bushing 6 fixed in position by means of a nut 6', an anti-friction bearing 18 being preferably disposed between the bushing 6 and a flange 19 provided within the cup 5 and engaging the outer end of the bushing 8. To the inner end of the stem 11' one of the sections of the valve body is fixed, which section is in the form of a cylindrical head 11 closely fitting within the bore of the sleeve 2. Further, on the stem 11' the section 12 of the valve body is mounted, which is formed with a tapering face adapted for engagement with the valve seat 2', the said section being movable on the stem in axial direction, as has been indicated by a screw 12' screwing in the hub 22 of the valve disk 12 and engaging in a groove 23 made in the valve stem. Between the valve sections 11 and 12 there is an elastic packing medium 13, preferably a disk of rubber. To the inner end face of the section 11 of the valve body an outwardly flaring cup is secured by means of screws 23, said cup being provided with holes 24 and blades 25, the said blades beginning at one side of the holes 24.

A similar valve is provided at the opposite end (not shown) of the tubular receptacle 1. But in the said valve the slide 10 and the inlet $3^a$ are omitted, the tubular member 3 of the valve being provided only with the branch pipe $3^b$.

When using my improved valve in connection with the receptacle 1 for splitting acetylene gas, I proceed as follows: After the acetylene gas confined within the receptacle 1 has been split by explosion into soot and hydrogen, the cup 5 is slightly turned to the left in order to relieve a key 7 fitted in a slot of the stem 11' of the pressure acting thereon, whereupon the said key is removed, and the stem 11' is pushed inwardly, so that the cylindrical bore of the sleeve 2 is opened. Preferably, the pressure within the receptacle 1 is first reduced by allowing the hydrogen to escape through a suitable valve (not shown) into a pressure chamber, until there is a pressure of about 8 atmospheres in the said pressure chamber. Thereafter, the pressure within the receptacle 1 is completely reduced, the residue of the hydrogen escaping into a container for collecting and separating the soot. From the said container the hydrogen is passed into a gasometer (not shown), or it is allowed to escape into the atmosphere. After both valves have been opened compressed hydrogen is admitted through the inlet 3ª, which hydrogen is preferably taken from the said pressure receptacle into which the hydrogen is first discharged from the receptacle 1, the said hydrogen being preferably admitted to the receptacle 1 by jars, so that the soot deposited on the inner wall of the receptacle 1 is made loose and removed from the said receptacle. By the flaring form of the cup 14 and the inclined blades 25 whirling movement is imparted to the hydrogen gas and the mixture of gas and soot, whereby the receptacle 1 is thoroughly cleaned. After the soot has thus been removed from the inner wall of the receptacle, and the main portion thereof carried into the collecting chamber, the lever 8ª is turned, thus moving the slide 10 into position away from the branch pipe 3ᵇ and for closing the inlet 3ª. As is known to those skilled in the art, the branch pipes 3ᵇ of both valves are connected to a closed tubular circuit including a blower or fan, and the said fan is operated a few minutes, so that the soot is completely removed from the receptacle 1 and the said receptacle is effectively cooled.

Now the stem 11' is pulled outwardly thus passing the sections 11 and 12 of the valve body and the packing medium 25 confined between the same into the cylindrical bore of the sleeve 2, the valve section 12 being placed on its seat 2'. Now the key 7 is again passed into the slot made therefor in the stem 11', and the cap 5 is screwed outwardly on the bushing 8 for pulling the stem 11' outwardly, the said cap acting on the bushing 6 and the key 7. Thus the stem 11' pulls the section 11 of the valve body outwardly and towards the section 12, the section 12 being fixed in position by being placed on its seat 2'. Therefore, the packing ring 13 of rubber is pressed outwardly and into engagement with the inner wall of the sleeve 2, so that the valve is tight even as against high pressure.

It appears therefore, that by constructing the valve body in two sections and enclosing a packing medium between the same, the said packing medium tightly closes the valve, so that upon explosion of the acetylene gas no hydrogen and soot have access into the bore of the sleeve 2, the said bore remaining perfectly clean even in case of numerous successive explosions. An important feature of the invention resides in providing the section 12 engaging the seat 2' at the outer side of the valve body, because thereby the pressure of the exploded gas acts on the section 11 thus increasing the pressure exerted on the packing medium 13, which therefore keeps away the soot from the valve seat 2'. Further, the figure shows that the section 11 of the valve body is thick as compared to the section 12. Therefore, the said section 11 has a high capacity for heat, so that the heat produced within the receptacle 1 is not transmitted to the rubber packing ring 13, and the said ring is not spoilt by heat.

While in describing the invention reference has been made to a particular example embodying the same I wish it to be understood that my invention is not limited to the construction shown in the drawing, and that various changes may be made in the general arrangement of the apparatus and the construction of its parts without departing from the invention.

What I claim is:—

1. A valve for high pressure receptacles, comprising a valve casing formed with a cylindrical chamber and a valve seat, of a valve body made in two sections axially movable relatively to each other and fitting in said cylindrical chamber and spaced from each other, the outer section looking from the side of the pressure receptacle being adapted to be placed on said seat, an elastic packing medium confined between said sections of the valve body and adapted to be pressed into tight engagement with said cylindrical wall by the inner section, and means for forcing said inner section towards said outer section.

2. A valve for high pressure receptacles, comprising a valve casing formed with a cylindrical chamber and a valve seat, of a stem extending from said chamber outwardly, a valve body made in two sections fitting in said chamber and one fixed to the inner end of said stem and the other one axially movable on said stem in position for being placed on said seat, an elastic packing medium confined between said sections of the valve body and adapted to be pressed into tight engagement with said cylindrical wall by said section on the inner end of the stem, and means for pulling said stem outwardly.

3. A valve for high pressure receptacles, comprising a valve casing formed with a cylindrical chamber and a valve seat, of a valve body made in two sections axially movable relatively to each other and fitting in said cylindrical chamber and spaced from each other, the outer section looking from the side of the pressure receptacle being adapted to be placed on said seat, an elastic packing medium confined between said sections of the valve body and adapted to be pressed into tight engagement with said cylindrical wall by the inner section, means for forcing said inner section towards said outer section, and a cup having a flaring wall fixed to the inner section, said valve casing having an inlet passage for fluid adapted to be forced through said cylindrical chamber and past said cup when said valve body is moved out of said cylindrical chamber.

4. A valve for high pressure receptacles, comprising a valve casing formed with a cylindrical chamber and a valve seat, of a valve body made in two sections axially movable relatively to each other and fitting in said cylindrical chamber and spaced from each other, the outer section looking from the side of the pressure receptacle being adapted to be placed on said seat, an elastic packing medium confined between said sections of the valve body and adapted to be pressed into tight engagement with said cylindrical wall by the inner section, means for forcing said inner section towards said outer section, and a cup having a flaring wall fixed to the inner section and formed with holes and blades for the passage of a fluid, said casing having a passage for supplying a fluid past the valve and through said cup when said valve body is moved out of said cylindrical chamber.

5. A valve for high pressure receptacles, comprising a valve casing formed with a cylindrical chamber and a valve seat and having a cylindrical extension formed with an inlet and an outlet, of a valve body for controlling the opening and closing of the passage through said cylindrical chamber made in two sections axially movable relatively to each other and fitting in said cylindrical chamber and spaced from each other, the outer section looking from the side of the pressure receptacle being adapted to be placed on said seat, an elastic packing medium confined between said sections of the valve body and adapted to be pressed into tight engagement with the cylindrical wall by the inner section, means for forcing said inner section towards said outer section, and a valve controlling said inlet and outlet.

6. A valve for high pressure receptacles, comprising a valve casing formed with a cylindrical chamber, a valve seat and a cylindrical extension having an inlet and an outlet, of a valve body for controlling the opening and closing of the passage through said cylindrical chamber made in two sections axially movable relatively to each other and fitting in said cylindrical chamber and spaced from each other, a stem for said valve body, the outer section looking from the side of the pressure receptacle being adapted to be placed on said seat, an elastic packing medium confined between said sections of the valve body and adapted to be pressed into tight engagement with the cylindrical wall by the inner section, a bushing rotatable in said extension and traversed by said stem, a slide valve connected with said bushing and controlling said inlet and outlet, and means for pulling said stem outwardly.

In testimony whereof I have affixed my signature.

JOSEF MACHTOLF.